US005149587A

United States Patent [19]

Hill et al.

[11] Patent Number: 5,149,587

[45] Date of Patent: Sep. 22, 1992

[54] RESEALABLE OUTSERT LABEL

[75] Inventors: Marilyn Hill, Marietta; Byron L. Baker, York, both of Pa.

[73] Assignee: Uarco Incorporated, Barrington, Ill.

[21] Appl. No.: 779,962

[22] Filed: Oct. 21, 1991

[51] Int. Cl.[5] ........................... B32B 7/12; G09F 3/00

[52] U.S. Cl. .................................... 428/354; 428/343; 428/40; 428/41; 428/42; 283/81; 281/5; 229/92.1

[58] Field of Search ................... 428/343, 354, 40, 41, 428/42; 283/81; 281/2, 5; 229/74, 92.1, 92.3

[56] References Cited

U.S. PATENT DOCUMENTS

| | | | |
|---|---|---|---|
| 476,880 | 9/1988 | Mertens . | |
| 4,592,572 | 6/1986 | Instance . | |
| 4,711,686 | 12/1987 | Instance . | |
| 4,744,161 | 5/1988 | Instance . | |
| 4,747,618 | 5/1988 | Instance | 283/81 X |
| 4,830,406 | 5/1989 | Instance | 283/81 |
| 4,849,043 | 7/1989 | Instance | 283/81 X |
| 4,991,878 | 2/1991 | Cowan et al. | 283/81 |
| 5,022,526 | 6/1991 | Crum | 40/311 X |
| 5,042,842 | 8/1991 | Green et al. | 283/81 X |
| 5,074,595 | 12/1991 | Hill et al. | 283/81 |
| 5,085,906 | 2/1992 | Ast et al. | 283/81 X |

*Primary Examiner*—George F. Lesmes
*Assistant Examiner*—D. R. Zirker
*Attorney, Agent, or Firm*—Samuel M. Learned, Jr.

[57] ABSTRACT

An improved resealable outsert label structure which embodies the interprinting of a release-reseal coating to provide a mechanical adhesion differential between that of the cover panel hinge and reseal tab so that the cover panel of the outsert label opens substantially easier from the reseal tab end in the event that a user would inadvertently attempt to open the outsert label from the hinge end and otherwise cause damage thereto.

5 Claims, 2 Drawing Sheets

Fig, 6
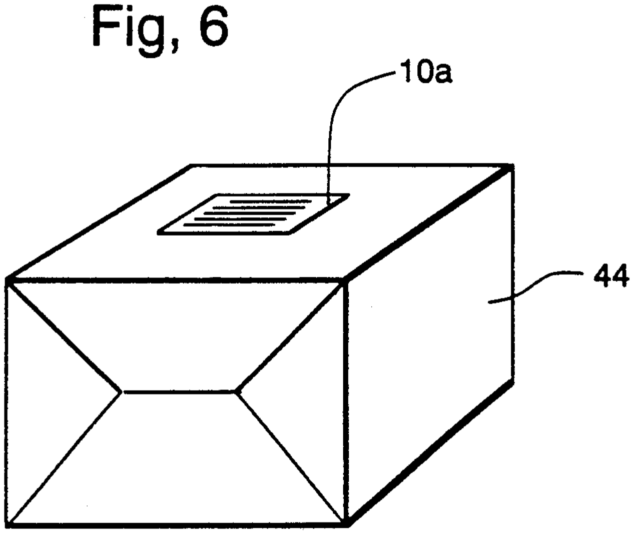
Fig. 7
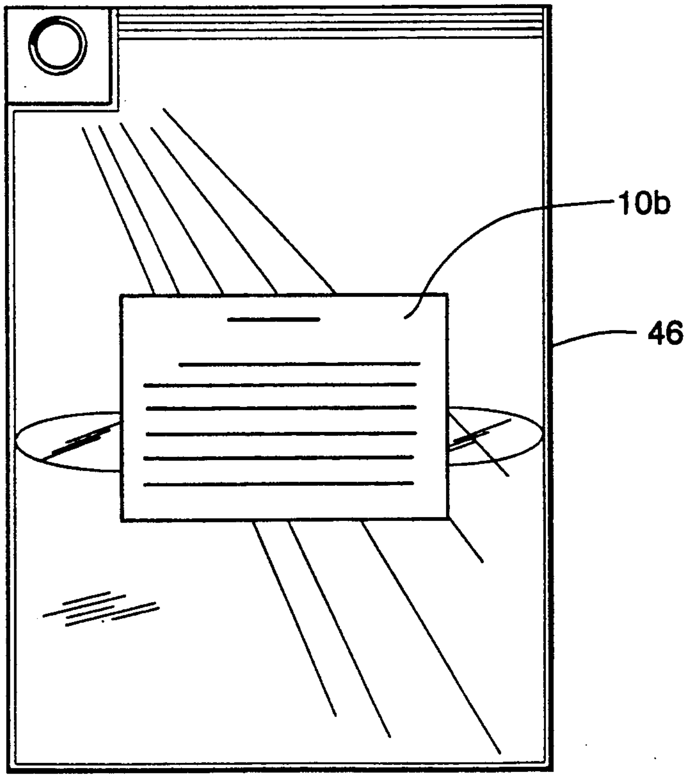

RESEALABLE OUTSERT LABEL

BACKGROUND OF THE INVENTION

The present invention relates to an improved structure for a resealable outsert label, and particularly to a label structure which mechanically incorporates by means of an interprinted release-reseal coating an adhesion differential between the opposing reseal tab and cover hinge ends of the outsert label such that the reseal tab end thereof is substantially easier to open in the event that a user would mistakenly attempt to open the label from the hinge end and otherwise cause damage thereto.

The conventional resealable outsert label is typically as taught by Instance in his U.S. Pat. No. 4,592,572 dated Jun. 3, 1986, wherein an alternate design embodiment thereof involves coating the inner face of an overlapping portion of the front cover panel with a material that renders the same hydrophobic thereby to allow the front cover to be selectively detached from and reattached thereto, so as to be able repeatedly to open and close the folded label.

Another Instance teaching, in his U.S. Pat. No. 4,711,686 dated Dec. 8, 1987, discloses a patterned holecut exposure of self adhesive to secure the cover flap overlap tab of an outsert label over the remaining folded panels, such that there is a lowered force required to pull the cover flap overlap tab away from the support web to unfold the cover and give access to the remaining panels, which arrangement is an alternate embodiment may incorporate the use of a resealable adhesive.

The Instance disclosure set forth in his U.S. Pat. No. 4,744,161 dated May 17, 1988, teaches a label having two separate bands of adhesive, one being for affixment of the label panels proper to a self adhesive support web and the other being to connect a release coated overlapping tab for opening the label.

Finally, in U.S. Pat. No. 4,768,810 to Mertens, dated Sep. 6, 1988, there is taught a so-called fanfold tablet formed from a web which bears a series of pressure-sensitive adhesive patterns imposed to foldably contact an adjacent sheet only in a non-adhesive area so that each sheet can be cleanly peeled from the adjacent sheet without adhesive transfer.

In the foregoing examples of resealable outsert labels, being generally typical of those which are currently available, it is possible for a consumer, as frequently occurrs, on first instance to inadvertently attempt to open the resealable folded label from the wrong side and thereby cause delamination damage to the label in such a way that it will not mechanically survive and meet the use and directional purposes for which it was intended to serve throughout the duration of the life of the packaged produce to which it is applied. A previous recognition of this specific problem of inadvertent user damage to an outsert or resealable folded label was addressed by Applicant's herein in their earlier and currently co-pending Application for U.S. Letters Patent titled "IMPROVED RESEALABLE FOLDED LABEL STRUCTURE", entered Jan. 22, 1991, bearing Ser. No. 07/643361, now U.S. Pat. No. 5,074,595 wherein an adhesion differential between the cover hinge area and the reseal tab of an outsert label was mechanically achieved by the mechanism of a graduated adhesive thickness profile wherein a thicker adhesive layer was provided in the cover hinge area than on the reseal tab thereby rendering the reseal tab end of the outsert label easier to open.

The Applicant's improved resealable outsert label structure as herein taught, however, mechanically provides a new and novel structurally incorporated differential ease of opening capability within the label profile which likewise enhances user opening of the label on the reseal tab side, thereby substantially reducing the likelihood of inadvertent user label damage of the cover hinge.

SUMMARY OF THE INVENTION

It is the principal object of the present invention to provide an improved resealable outsert label which is structurally and mechanically characterized and distinguished by interprinting a strip of release-reseal coating within the label profile upon that layer next interior and adjacent to the cover panel thereof, and thereafter skip-printing cover hinge and release-reseal adhesive strips such that the adhesive strip which serves to adhere the resealing tab of the cover panel is laid down over the interprinted release-reseal coating and that adhesive strip which serves to adhere the cover panel hinge to the next interior and adjacent layer is laid down directly thereon and abuttable to the strip of release-reseal coating so there is no interlayering of release-reseal coating therebetween, with the desired mechanical result that the resealing tab with its interlayer of release-reseal coating has sufficient adhesion to effect the initial closure sealing of said tab as well as repeated openings and resealings thereof but has a substantially weaker mechanical adhesion than that of the cover panel hinge bond and is therefore substantially easier to open in the event that a user would inadvertently attempt to open the outsert label from the hinge end and otherwise cause damage thereto.

It is another object of the present invention to provide an improved resealable outsert label which can be manufactured by currently available machine technology and supplied in either a sheet or roll form, with either a fiber or film base, suitable for either manual or automated mechanical application to a wide variety of end use products and product containers.

The foregoing, and other objects hereof, will be readily evident upon a study of the following specification and accompanying drawings comprising a part thereof.

BRIEF DESCRIPTION OF THE DRAWINGS

FIG. 6 illustrates a typical use application employment of the fiber base version of the improved resealable outsert label of the instant invention.

FIG. 7 illustrates a typical use application employment of the film base version of the improved resealable outsert label of instant invention.

DETAILED DESCRIPTION OF THE INVENTION

Figure 1:
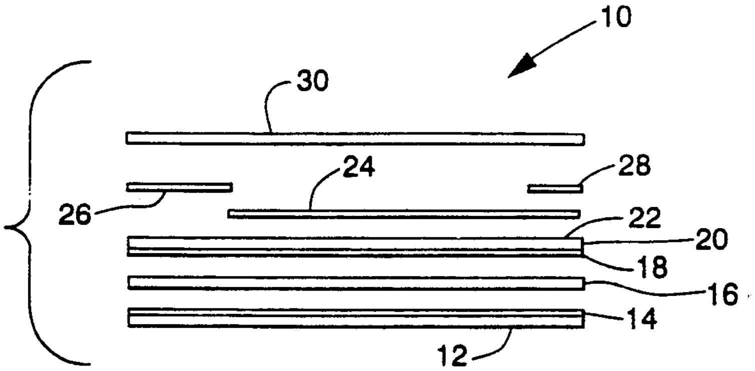
FIG. 1 is an exploded pre-assembly side elevation view of the various componenı segments comprising the improved resealable outsert label structure of instant invention.

Referring to FIG. 1, the improved resealable outsert label 10 of instant invention is illustrated in an exploded pre-assembly side elevation view showing the various laminate layer components comprising the same, being from the bottom up the carrier liner 12 upon which the assembled label 10 is supported and from which it is subsequently removed for application to a use surface, a layer of adhesive release medium 14 imprinted upon the carrier liner 12 which functions to facilitate peelable removal release of the carrier liner 12 from the pressure sensitive adhesive layer 16 for use application of the label 10, the pressure sensitive adhesive bonding medium 18 imprinted upon the lower surface of the base layer 20 and which functions to effect secure affixment bonding of the pressure sensitive adhesive layer 16 to the base layer 20 so the label 10 assembly is made to functionally withstand rigors of use employment in the application environment wherein the base layer upper surface 22 is usually imprinted with label information, the release-reseal coating strip 24 imprinted upon the base layer 20 upper surface 22 being imprinted thereon after any label information and being colorless and transparent so that the imprinted label information clearly shows therethrough, the cover panel hinge adhesive 26 and the reseal tab adhesive 28 being simultaneously skip-imprinted with the hinge adhesive 26 being applied directly to the base layer 20 and the tab adhesive 28 to the release-reseal coating strip 24, and lastly the label cover panel 30 which is assembled to the label 10 structure and held in place by being bondably adhered at one end thereof to the hinge adhesive 26 and at the other end thereof releasibly to the reseal tab adhesive 28.

Figure 2:
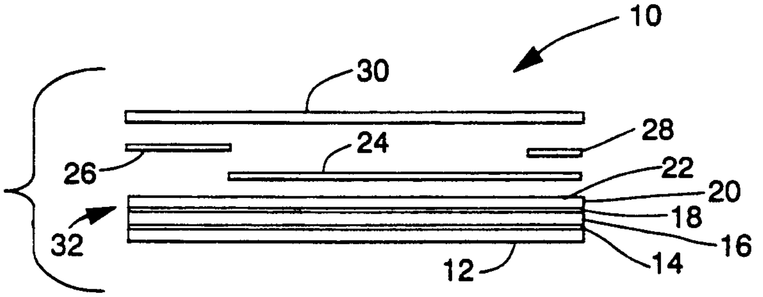
FIG. 2 is a view of the improved resealable outsert label structure similar to that as previously illustrated in FIG. 1, but herein showing the base component segments thereof in the assembled state.

As shown in FIG. 1, there is typically a pre-assembly of the adhesive release medium 14 to the carrier liner 12 and the pressure sensitive adhesive bonding medium 18 to the base 20, wherein these pre-assembled components are supplied as such and will then be infed to the printing and conversion machinery for producing a composite label support layer 32 as shown in FIG. 2. This composite label support layer 32 comprised of a pressure sensitive adhesive layer 16 bonding to the base layer 20 thereafter being protectively assembled to the adhesive release medium layer 14 coated carrier liner 12 is a conventional and typically universal structure for most types of pressure sensitive adhesive labels, and as was previously pointed out the base layer upper surface 22 may have been previously imprinted with label text and illustrations prior to accomplishment of the aforementioned composite label support layer 32 assembly operations.

Figure 3:
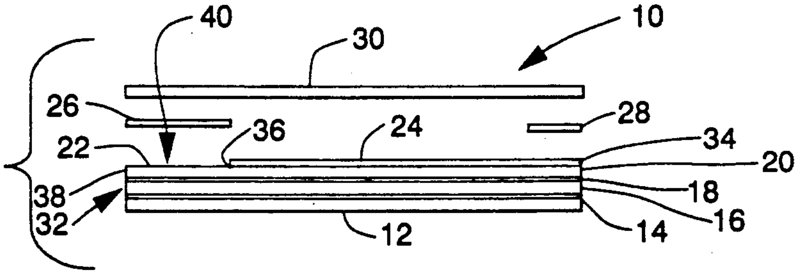
FIG. 3 is a view of the improved resealable outsert label structure similar to that as previously illustrated in FIG. 2, but herein showing interprint lay-down of the reseal tab release-reseal coating component thereof.

Referring now to FIG. 3, which illustrates imprint of the release-reseal coating strip 24, being laid down directly upon and over-printing any previously imposed label text and illustrative matter upon the base layer upper surface 22, extending across the face of the base layer upper surface 22 from the edge of the reseal tab end 34 to the cover hinge interior beginning end 36 thereof. The positioning of the release-reseal coating strip 24 upon the base layer upper surface 22 is such that it will receive a planar abuttable imprinting of the cover panel hinge adhesive 26 against the cover hinge interior beginning end 36 thereof and extend outwardly therefrom to the cover hinge end 38 edge at one end of the label 10 and at the other end thereof receive an overprinting impression of the reseal tab adhesive 28 inwardly from the reseal tab end 34 label 10 edge. It is the above-described imprint sequence and profile of first the release-reseal coating strip 24 and then the skip printed cover panel hinge adhesive 26 with the reseal tab adhesive 28 which provides the mechanical adhesion differential between that of the cover panel hinge 40 and the reseal tab 42 whereby the cover panel 30 opens substantially easier from the reseal tab end 34 in the event that a suer would inadvertently attempt to open the label 10 from the cover hinge end 38 and otherwise cause damage thereto.

Figure 4:
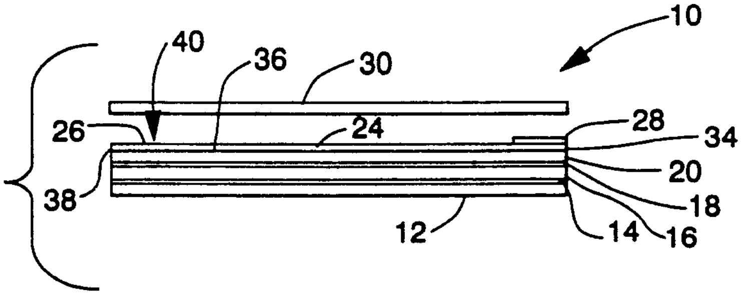
FIG. 4 is a view of the improved resealable outsert label structure similar to that as previously illustrated in FIG. 3, but herein showing skip-printing lay-down of the cover hinge and reseal tab release-reseal adhesive strip components thereof.

The view shown in FIG. 4 illustrates the imprinted relationship of the respective adhesive strips 26 and 28 one to the other in relative spatial terms within the label 10 structure and respectively with the release-reseal coating strip 24, the base layer 20 and the upper surface 22 thereof, in addition to the label cover panel 30 which is bondably adhered by means of the cover panel hinge adhesive 26 to the base layer 20 across the cover panel hinge 40 at the cover hinge end 38 and releasably sealed by the reseal tab adhesive 28 at the reseal tab end 34. As also shown, the cover panel hinge adhesive 26 is laid down upon the base layer 20 and abutts the release-reseal coating strip 24 in planar coincidence at the cover hinge interior beginning end 36 thereof, and the reseal tab adhesive 28 is imprinted to overlie the release-reseal coating strip 24 at the reseal tab end 34.

Figure 5:
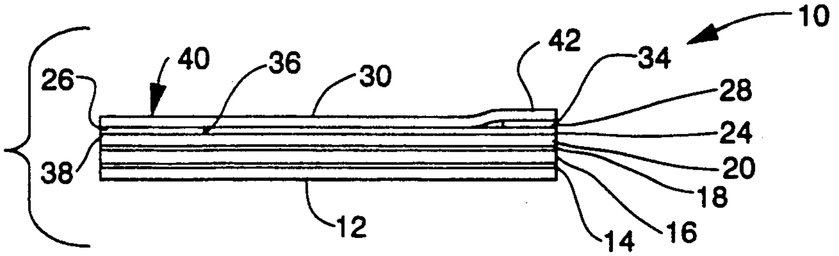
FIG. 5 is a fully assembled side elevation view of the component segments comprising the improved resealable outsert label structure of instant invention.

Lastly, with respect tot eh label 10 mechanical structure per se, as shown in FIG. 5, the label cover panel 30 is applied in bondable adherence to the base layer by means of the cover panel hinge adhesive 26 across the cover panel hinge 40 as well as also bondably to the reseal tab adhesive 28 at the label 10 reseal tab end 34. In the latter regard, the reseal tab adhesive 28, although applied to the release-reseal coating strip 24, actually releases therefrom on tab opening and transfers in bondable adhesion to the reseal tab 42 upon final application of the cover panel 30 to the label 10 structure.

With respect to the materials of construction of the label 10, with the exception of the base layer 20 which may be either a fiber material such as paper or the like in one case, or alternately a film material such as plastic or the like in the other case, wherein the materials of construction for the remaining components of the improved resealable outsert label 10 are those typically employed in making resealable outsert labels, and are specifically determined by factors such as the use environment to which the label will be exposed, the machine handling characteristics of the particular components in accomplishing automated label manufacture, the mechanical compatability of the respective label components, and other such factors of the foregoing nature.

Considering now the view shown in FIG. 6, therein illustrating a typical use employment application of a fiber based improved resealable outsert label 10*a*, which is the subject label provided with base layer 20 constructed of a fiber material such as paper or the like. The fiber based improved resealable outsert label 10*a* is most suitably adapted for affixment to rigid support surfaces such as boxes and cartons 44, and the label structure 10*a* need not be capable of withstanding flex and distortion of the support surface to which it is applied, whereby label economies are efficiently adapted to the use environment.

The view shown in FIG. 7 illustrates a typical use employment application of a film based improved resealable outsert label 10*b*, which label is provided with a base layer 20 constructed of a film material such as plastic or the like. In this case, although the label 10*b* is useful for application upon almost any surface, it is most suitably adapted for affixment to non-rigid support surfaces such as that of a pliable container 46 exemplified by a plasma bag or the like.

Although the invention has been herein shown and described in what is conceived to be the most practical and preferred embodiment, it is recognized that departures may be made therefrom within the scope thereof, which is not to be limited to the specific details disclosed herein but is to be accorded the full scope of the claims so as to embrace any and all equivalent such resealable outsert label structures.

We claim:

1. An improved resealable outsert label structure comprising in combination, a carrier liner backing having applied to the upper side surface thereof an adhesive release medium, a base layer having applied to the immediate underside surface thereof a pressure sensitive adhesive bonding medium in turn bonding thereto a pressure sensitive adhesive layer to detachably assemble said base layer to said adhesive release medium upon said carrier liner backing, a base layer upper surface having applied thereto a release-reseal coating strip inward from a cover hinge end thereof uniformily thereacross to a reseal tab end thereof, a cover panel hinge adhesive applied from the cover hinge end of said base layer upper surface inward therefrom in planar abuttable coincidence with aid release-reseal coating strip, a reseal tab adhesive strip applied upon aid release-reseal coating strip beginning more than half-way inward thereacross from the cover hinge interior beginning end thereof to the reseal tab end thereof, and a cover panel bondably adhered top the base layer upper surface at one end thereof by the cover panel hinge adhesive and releasably adhered to the base layer upper surface at the other end thereof by said reseal tab adhesive strip.

2. The improved resealable outsert label structure according to claim 1 wherein said base layer is a fiber material.

3. The improved resealable outsert label structure according to claim 2 wherein said fiber material is paper.

4. The improved resealable outsert label structure according to claim 1 wherein said base layer is a film material.

5. The improved resealable outsert label structure according to claim 4 wherein said film material is plastic.

* * * * *